(12) United States Patent
Sinclair et al.

(10) Patent No.: US 7,032,500 B1
(45) Date of Patent: Apr. 25, 2006

(54) SINGLE POINT STEERING GEAR HYDRAULIC CONNECTION

(75) Inventors: Daryl A. Sinclair, Clarkston, MI (US); Jim P. Beatty, Marysville, MI (US); Alexander L. Grant, Highland, MI (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 10/928,693

(22) Filed: Aug. 27, 2004

(51) Int. Cl.
*F01B 29/00* (2006.01)

(52) U.S. Cl. ...................................... 92/128; 285/124.3

(58) Field of Classification Search .................. 92/128, 92/163; 285/124.2, 124.3, 124.4
See application file for complete search history.

(56) References Cited

U.S. PATENT DOCUMENTS

| | | | | |
|---|---|---|---|---|
| 5,294,156 A | * | 3/1994 | Kumazaki et al. | 285/124.2 |
| 5,387,014 A | * | 2/1995 | Chevallier | 285/124.2 |
| 5,556,138 A | * | 9/1996 | Nakajima et al. | 285/124.4 |
| 5,860,681 A | * | 1/1999 | Slais | 285/124.3 |
| 6,488,314 B1 | * | 12/2002 | Hutter | 285/124.2 |
| 6,682,100 B1 | * | 1/2004 | Wood et al. | 285/124.3 |
| 6,776,421 B1 | * | 8/2004 | Arrand et al. | 285/124.3 |
| 6,908,117 B1 | * | 6/2005 | Pickett et al. | 285/137.11 |

* cited by examiner

*Primary Examiner*—Edward K. Look
*Assistant Examiner*—Michael Leslie
(74) *Attorney, Agent, or Firm*—Dykema Gossett PLLC

(57) ABSTRACT

A power steering assembly is provided that enables a secure, simultaneous connection of supply and return hose assemblies to a steering gear. The assembly includes a mounting bracket having an aperture through which one of the hose assemblies extends and a notch configured to receive the other hose assembly. The bracket is deformable such that the other hose assembly can be secured within the notch after insertion. The pressure and return hose assemblies include either a connector having opposed shoulders on either side of the bracket or are deformed to create beads on either side of the bracket to restrict movement thereby eliminating welds or brazes. Each of the hose assemblies further includes a groove formed to receive a seal. These grooves on the external portion of the hose assemblies reduce costly machining on the steering gear head.

14 Claims, 1 Drawing Sheet

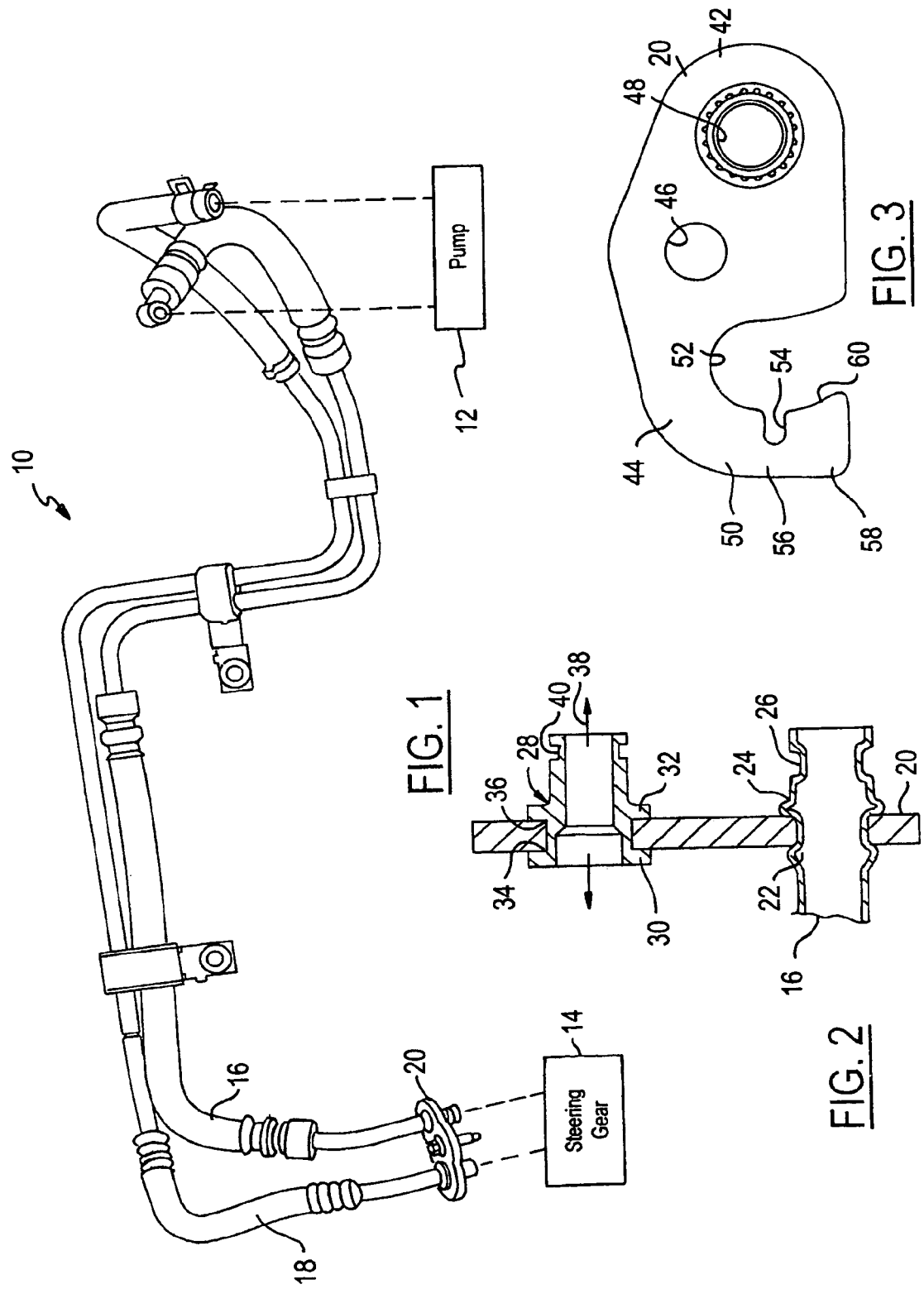

SINGLE POINT STEERING GEAR HYDRAULIC CONNECTION

BACKGROUND OF THE INVENTION

1. Field of the Invention

This invention relates to power steering systems and, in particular, to the connection of supply and return hoses to a steering gear.

2. Discussion of Related Art

A conventional power steering assembly includes a pump, a steering gear and supply and return hose assemblies extending between the pump and steering gear. The supply hose assembly provides pressurized fluid from the pump to the steering gear while the return hose assembly returns fluid from the steering gear to a pump reservoir. Conventional assemblies include a variety of brackets that are used to support and mount the hose assemblies within a vehicle. In one conventional assembly, a bracket is used to couple the hose assemblies to the steering gear using a fastener extending through the bracket and into the steering gear. The bracket defines an aperture through which the supply hose assembly extends. The bracket further defines a notch that receives the return hose assembly. This assembly is disadvantageous, however, because an additional member such as a clip is required to retain the return hose assembly to the bracket and retain the return hose assembly within the notch.

Conventional assemblies also suffer from other problems. In many conventional assemblies, the steering gear housing must be formed to receive seals located between the housing and the supply and return hose assemblies coupled to the housing. The hose assemblies are also often coupled to mounting brackets with brazed joints increasing assembly time and costs. Many conventional assemblies also require multiple steps to install and connect the supply and return hose assemblies.

The inventors herein have recognized a need for a power steering assembly that will minimize and/or eliminate one or more of the above-identified deficiencies.

SUMMARY OF THE INVENTION

The present invention provides a fluid flow assembly for a power steering system.

A fluid flow assembly in accordance with the present invention includes first and second hose assemblies each disposed between a pump and a steering gear. The first hose assembly provides pressurized fluid from the pump to the steering gear. The second hose assembly returns fluid from the steering gear to the pump. The fluid flow assembly further includes a bracket configured for connecting the hose assemblies to the steering gear. The bracket includes a first portion defining a first aperture through which one of the first and second hose assemblies extends. The bracket further defines a second portion defining a deformable finger extending from the first portion. The first and second portions define a notch formed in a perimeter of the bracket. The notch is configured to receive another of the first and second hose assemblies and the second portion is deformed after insertion of the another hose assembly to retain the another hose assembly within the notch.

A fluid flow assembly for a power steering system in accordance with the present invention is advantageous. The assembly enables a secure, simultaneous connection of both the supply and return hose assemblies to the steering gear using a bracket without the need for additional parts. In one embodiment of the invention, grooves are also formed in each hose assembly configured to receive seals thereby eliminating the need to form grooves in the steering gear housing and further simplifying assembly.

These and other advantages of this invention will become apparent to one skilled in the art from the following detailed description and the accompanying drawings illustrating features of this invention by way of example.

BRIEF DESCRIPTION OF THE DRAWINGS

FIG. 1 is a diagrammatic view of a power steering assembly in accordance with the present invention.

FIG. 2 is a sectional view of a portion of the assembly of FIG. 1.

FIG. 3 is a plan view of the bracket of the assembly of FIG. 1.

DETAILED DESCRIPTION OF EMBODIMENTS OF THE INVENTION

Referring now to the drawings wherein like reference numerals are used to identify identical components in the various views, FIG. 1 illustrates a power steering assembly 10 in accordance with the present invention. Assembly 10 is particularly adapted for use in vehicles. It should be understood, however, that the present invention may be used in non-vehicular applications where steering is required. Assembly 10 is provided to assist the operator of a vehicle or other device in steering the vehicle or device by providing additional motive force responsive to operator actions. Assembly 10 may include a pump 12, a steering gear 14, supply and return hose assemblies 16, 18 and a bracket 20 in accordance with the present invention.

Pump 12 is provided to produce fluid flow to provide the force required for operation of gear 14. Pump 12 is conventional in the art and may be driven responsive to rotation of an engine crankshaft (not shown) or other power output member of the engine. Pump 12 may comprise any of a variety of conventional pumps including roller pumps, vane pumps, slipper pumps and gear pumps.

Steering gear 14 is provided to convert rotary motion from a steering wheel (not shown) into linear motion to move a steering linkage (not shown) coupled to one or more wheels (not shown). Gear 14 is also conventional in the art and may comprise any of a variety of conventional steering gears including recirculating ball gears, worm and roller gears and rack and pinion steering gears. Gear 14 includes a housing defining a pair of female inlets configured to receive one end of hose assemblies 16, 18.

Hose assemblies 16, 18 are provided to transmit fluid between pump 12 and steering gear 14 and are disposed between pump 12 and gear 14. Hose assembly 16 supplies pressurized fluid from pump 12 to steering gear 14 while hose assembly 18 returns fluid from steering gear to a reservoir of pump 12. Hose assemblies 16, 18 may comprise a plurality of sections of metal tubing and reinforced synthetic rubber crimped together and/or overlaid at connection points.

Referring to FIG. 2, hose assembly 16 may be deformed to form two spaced beads 22, 24 having an increased diameter relative to surrounding portions of hose assembly 16. Bead 22 may be formed prior to insertion of hose assembly 16 within bracket 20. Hose assembly 16 is then inserted into bracket 20 until bead 22 engages one side of bracket 20. Hose assembly 16 may then be deformed to form bead 24 which engages the opposite side of bracket 20. Beads 22, 24 have a diameter that is greater than the diameter of the aperture in bracket 20 through which hose 16 assembly extends. As a result, hose assembly 16 is retained in place relative to bracket 20 without the need for brazing or other costly manufacturing operations. Hose assembly 16 may further define a groove 26 proximate one end configured to receive a seal (not shown). Groove 26 may be roll-formed in hose assembly 16. Forming groove 26 in hose assembly 16 eliminates costly machining of the steering gear housing and/or brazing a separate end having an external groove.

Hose assembly 18 may include a connector 28 at one end. Connector 28 may be made from conventional metals or metal alloys such as steel and may be a separate component coupled to the remainder of hose assembly 18 or an integral part of an existing component of hose assembly 18. Connector 28 may be generally cylindrical in shape and includes a pair of spaced circumferential flanges 30, 32 defining opposed shoulders 34, 36. Bracket 20 may be received between shoulders 34, 36 to retain hose assembly 18 from movement relative to bracket 20 along an axis 38. Connector 28 may further define a groove 40 proximate one end configured to receive a seal (not shown). Again, by forming groove 40 in hose assembly 18, costly machining of the steering gear housing is eliminated.

Bracket 20 is configured for mounting to steering gear 14 and is provided to enable simultaneous coupling of hose assemblies 16, 18 to steering gear 14. Bracket 20 includes multiple portions 42, 44, with portion 44 being deformable. Portion 42 defines a pair of apertures 46, 48. Aperture 46 is sized to receive a fastener such as a bolt, screw or pin configured for insertion into steering gear 14 to thereby couple bracket 20 to steering gear 14. The fastener is preassembled within aperture 46 of bracket 20 to allow the entire fluid flow assembly including hose assemblies 16, 18 and bracket 20 to be connected to steering gear 14 without additional parts by simply inserting the fastener into steering gear 14 and applying appropriate torque. Aperture 46 is located at approximately the midpoint of bracket 20 and between hose assemblies 16, 18 upon assembly with bracket 20. Aperture 48 is sized to receive supply hose assembly 16 which extends therethrough. As described hereinabove, hose assembly 16 may be deformed such that hose assembly 16 engages each side of bracket 20 proximate aperture 48. Portion 44 defines a deformable finger 50 that extends from portion 42. Portions 42, 44 together define a notch 52 extending inwardly and formed in the perimeter of bracket 20. Notch 52 is configured at its open end to receive connector 28 of hose assembly 18 prior to deformation of finger 50. Notch 52 has a generally semicircular shape proximate a closed end also sized relative to connector 28 of hose assembly 18. A generally U-shaped notch 54 is formed in finger 50 extending from notch 52 and thereby has an open end in communication with notch 52. In this manner, a knuckle 56 is formed in finger 50. After insertion of connector 28 within notch 52, finger 50 is deformed by rotating end portion 58 of finger 50 in a counter-clockwise direction (relative to the view in FIG. 3) until an inner surface 60 of end portion 58 retains connector 28. Surface 60 is preferably arcuate in shape or otherwise complementary to the shape of connector 28. After deformation, notch 52 is preferably disposed around more than half of the outer circumference or perimeter of connector 28 to thereby retain connector 28 within bracket 20 without the use of additional parts.

A fluid flow assembly for a power steering system in accordance with the present invention represents an improvement as compared to conventional assemblies. In particular, hose assemblies 16, 18 may be mounted to steering gear 14 at the same time and in a single operation using bracket 20 without requiring additional parts to secure hose assembly 18 to bracket 20.

While the invention has been shown and described with reference to one or more particular embodiments thereof, it will be understood by those of skill in the art that various changes and modifications can be made without departing from the spirit and scope of the invention.

We claim:

1. A fluid flow assembly for a power steering system, comprising:
    first and second hose assemblies each disposed between a pump and a steering gear, said first hose assembly providing pressurized fluid from said pump to said steering gear and said second hose assembly returning fluid from said steering gear to said pump;
    a bracket configured for connecting said first and second hose assemblies to said steering gear, said bracket including:
        a first portion defining a first aperture through which one of said first and second hose assemblies extends;
        a second portion defining a deformable finger extending from said first portion
        said first and second portions defining a first notch formed in a perimeter of said bracket and configured to receive another of said first and second hose assemblies wherein said second portion is deformed after insertion of said another hose assembly to retain said another hose assembly within said first notch.

2. The fluid flow assembly of claim 1 wherein said one hose assembly is said first hose assembly and said another hose assembly is said second hose assembly.

3. The fluid flow assembly of claim 2 wherein said first hose assembly is deformed on either side of said bracket to form first and second beads having a diameter greater than a diameter of said first aperture.

4. The fluid flow assembly of claim 2 wherein said first hose assembly defines a groove configured to receive a seal.

5. The fluid flow assembly of claim 2 wherein said second hose assembly includes a connector defining first and second opposed shoulders between which said bracket is received.

6. The fluid flow assembly of claim 2 wherein said second hose assembly includes a connector defining a groove configured to receive a seal.

7. The fluid flow assembly of claim 1 wherein said first portion of said bracket defines a second aperture configured to receive a fastener, said fastener configured for insertion into said steering gear.

8. A power steering assembly, comprising:
    a pump;
    a steering gear;
    first and second hose assemblies each disposed between said pump and said steering gear, said first hose assembly providing pressurized fluid from said pump to said steering gear and said second hose assembly returning fluid from said steering gear to said pump;
    a bracket configured for connecting said first and second hose assemblies to said steering gear, said bracket including:

a first portion defining a first aperture through which one of said first and second hose assemblies extends;

a second portion defining a deformable finger extending from said first portion said first and second portions defining a first notch formed in a perimeter of said bracket and configured to receive another of said first and second hose assemblies wherein said second portion is deformed after insertion of said another hose assembly to retain said another hose assembly within said first notch.

9. The fluid flow assembly of claim 8 wherein said one hose assembly is said first hose assembly and said another hose assembly is said second hose assembly.

10. The fluid flow assembly of claim 9 wherein said first hose assembly is deformed on either side of said bracket to form first and second beads having a diameter greater than a diameter of said first aperture.

11. The fluid flow assembly of claim 9 wherein said first hose assembly defines a groove configured to receive a seal.

12. The fluid flow assembly of claim 9 wherein said second hose assembly includes a connector defining first and second opposed shoulders between which said bracket is received.

13. The fluid flow assembly of claim 9 wherein said second hose assembly includes a connector defining a groove configured to receive a seal.

14. The fluid flow assembly of claim 8 wherein said first portion of said bracket defines a second aperture configured to receive a fastener, said fastener configured for insertion into said steering gear.

* * * * *